United States Patent
Jiang et al.

(10) Patent No.: US 11,662,418 B2
(45) Date of Patent: May 30, 2023

(54) BLIND AREA TRACKING METHOD AND APPARATUS FOR DIRECTIONAL ANTENNA AND MOTION TRACKING SYSTEM

(71) Applicant: AUTEL ROBOTICS CO., LTD., Guangdong (CN)

(72) Inventors: Xianhong Jiang, Guangdong (CN); Yunyang Xu, Guangdong (CN)

(73) Assignee: AUTEL ROBOTICS CO., LTD., Shenzhen (CN)

(*) Notice: Subject to any disclaimer, the term of this patent is extended or adjusted under 35 U.S.C. 154(b) by 356 days.

(21) Appl. No.: 16/926,229

(22) Filed: Jul. 10, 2020

(65) Prior Publication Data
US 2020/0341135 A1 Oct. 29, 2020

Related U.S. Application Data

(63) Continuation of application No. PCT/CN2019/071993, filed on Jan. 16, 2019.

(30) Foreign Application Priority Data

Jan. 12, 2018 (CN) .......................... 201810031492.9

(51) Int. Cl.
*G01S 3/802* (2006.01)
*G01S 1/08* (2006.01)
(Continued)

(52) U.S. Cl.
CPC .............. *G01S 3/8025* (2013.01); *G01S 1/08* (2013.01); *G01S 3/56* (2013.01); *H01Q 3/02* (2013.01); *H04W 64/006* (2013.01)

(58) Field of Classification Search
CPC .......... G01S 13/72; G01S 1/08; G01S 5/0294; H01Q 3/02; H01Q 3/08; H04W 64/006
(Continued)

(56) References Cited

U.S. PATENT DOCUMENTS 6,310,582 B1 * 10/2001 Uetake .................. H01Q 1/125
343/890
6,531,990 B2 * 3/2003 Verkerk .................. H01Q 3/08
343/765

FOREIGN PATENT DOCUMENTS

CN 103022696 A 4/2013
CN 104932548 A * 9/2015
(Continued)

OTHER PUBLICATIONS

The First Chinese Office Action dated May 5, 2019; Appln. No. 201810031492.9.
(Continued)

*Primary Examiner* — Vladimir Magloire
*Assistant Examiner* — Alexander L. Syrkin

(57) ABSTRACT

The present invention relates to a blind area tracking method and apparatus for a directional antenna and a motion tracking system. The method includes: acquiring a position and a velocity of a tracking target relative to the directional antenna; determining, according to the position and the velocity, whether the tracking target is located in a tracking blind area of the directional antenna; and driving, in a preset blind area guidance mode and when the tracking target is located in the tracking blind area, the directional antenna to rotate. The method may help switch to a corresponding blind area guidance mode when an unmanned aerial vehicle enters a tracking blind area, to implement all-the-way tracking of a tracking target without temporarily losing the tracking target within the tracking blind area. In this way, a better tracking effect is ensured.

15 Claims, 4 Drawing Sheets

(51) Int. Cl.
*H01Q 3/02* (2006.01)
*H04W 64/00* (2009.01)
*G01S 3/56* (2006.01)

(58) Field of Classification Search
USPC .......................................................... 342/146
See application file for complete search history.

(56) References Cited

FOREIGN PATENT DOCUMENTS

| CN | 104932548 | A |   | 9/2015  |         |          |
|----|-----------|---|---|---------|---------|----------|
| CN | 104977580 | A |   | 10/2015 |         |          |
| CN | 108281789 | A |   | 7/2018  |         |          |
| CN | 108761416 | A | * | 11/2018 | ........ | G01S 7/41 |
| WO | WO-2016130495 | A1 | * | 8/2016 | ........ | G01S 13/86 |

OTHER PUBLICATIONS

The International Search Report dated Apr. 9, 2019; PCT/CN2019/071993.
Extended European Search Report dated Mar. 18, 2021; Appln. No. 19738032.2.

* cited by examiner

BLIND AREA TRACKING METHOD AND APPARATUS FOR DIRECTIONAL ANTENNA AND MOTION TRACKING SYSTEM

This application is a continuation application of International Application No. PCT/CN2019/071993, filed on Jan. 16, 2019, which claims priority of Chinese Patent Application No. 201810031492.9, filed on Jan. 12, 2018, which is incorporated herein by reference in its entirely.

BACKGROUND

Technical Field

The present invention relates to the field of tracking system technologies, and in particular, to a blind area tracking method and apparatus for a directional antenna and a motion tracking system.

Related Art

As unmanned aerial vehicle technologies develop and mature, application scenarios of the unmanned aerial vehicle technologies become increasingly extensive. A large amount of measurement and control data needs to be exchanged between an unmanned aerial vehicle and a ground control system. Therefore, a motion tracking system may be adopted to ensure reliability of data transmission and improve a gain and an anti-interference capability during the data transmission.

A function of the motion tracking system is to isolate an effect of motion of a carrier (for example, a vehicle, a ship or an airplane) on an attitude of a directional antenna in a motion process of the carrier, and to ensure that the directional antenna is always aligned with a high-velocity maneuverable unmanned aerial vehicle, to implement continuous communication during the motion. For a frequently-used motion tracking system with an azimuth-pitch structure, there is a tracking blind area at a top location of the directional antenna.

When a tracking target flies through the tracking blind area, in the existing guidance manner, a one-time guidance policy is adopted, with which an azimuth of a tracking platform is directly driven to rotate to the other end of the blind area. In this guidance manner, the tracking target may be lost within the tracking blind area and a moving state of the tracking target needs to remain unchanged within the blind area. In this way, the motion tracking system can capture the tracking target again when the tracking target flies out of the blind area.

SUMMARY

To resolve the foregoing technical problem, embodiments of the present invention provide a blind area tracking method and apparatus and a motion tracking system that may keep effective tracking of a tracking target within a tracking blind area.

To resolve the foregoing technical problem, an embodiment of the present invention provides the following technical solution: a blind area tracking method for a directional antenna. The blind area tracking method includes:

acquiring a position and a velocity of a tracking target relative to the directional antenna; determining, according to the position and the velocity, whether the tracking target is located in a tracking blind area of the directional antenna; and driving, in a preset blind area guidance mode and when the tracking target is located in the tracking blind area, the directional antenna to rotate.

To resolve the foregoing technical problem, an embodiment of the present invention further provides the following technical solution:

a blind area tracking apparatus for a directional antenna. The blind area tracking apparatus includes: an information acquiring module, configured to acquire a position and a velocity of a tracking target; a blind area determining module, configured to determine, according to the position and the velocity, whether the tracking target is located in a tracking blind area of the directional antenna; and a driving module, configured to drive an azimuth axis and a pitch axis of the directional antenna to rotate, so that the directional antenna is aligned with the tracking target.

To resolve the foregoing technical problem, an embodiment of the present invention further provides the following technical solution:

a motion tracking system for an unmanned aerial vehicle. The motion tracking system includes a directional antenna, a motion platform, an information receiver and a control system;

the directional antenna being disposed on the motion platform and the motion platform being configured to track the unmanned aerial vehicle; the information receiver being configured to acquire a position of the directional antenna, a moving velocity of the motion platform and information about a position and a velocity of the unmanned aerial vehicle, the information being delivered by the unmanned aerial vehicle; and the control system being configured to drive, according to the position of the directional antenna, the moving velocity of the motion platform and the information about the position and the velocity of the unmanned aerial vehicle that are acquired by the information receiver and by using the foregoing blind area tracking method for a directional antenna, the directional antenna to rotate, so that the directional antenna keeps tracking of the unmanned aerial vehicle within the tracking blind area.

Compared with the prior art, the blind area tracking method provided in the embodiments of the present invention may help switch to a corresponding blind area guidance mode when an unmanned aerial vehicle enters a blind area, to implement all-the-way tracking of a tracking target and continuous communication between a directional antenna and the tracking target without temporarily losing the tracking target within the tracking blind area. In this way, a better tracking effect and a better communication effect are ensured.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

To facilitate the understanding of the present invention, the present invention is further described below in further detail with reference to the accompanying drawings and specific embodiments. It should be noted that, when an element is described to be "fixed on" another element, it may be directly fixed on the another element, or there may be one or more intermediate elements therebetween. When an element is described to be "connected to" another element, it may be directly connected to the another element, or there may be one or more intermediate elements therebetween. In this specification, orientation or position relationships indicated by the terms such as "up", "down", "inside", "outside" and "bottom" are based on orientation or position relationships shown in the accompanying drawings, and are used only for ease of description of the present invention and for brevity, rather than indicating or implying that the mentioned apparatus or element needs to have a particular orientation or needs to be constructed and operated in a particular orientation. Therefore, such terms should not be construed as limiting of the present invention. In addition, terms "first", "second" and "third" are only used to describe the objective and cannot be understood as indicating or implying relative importance.

Unless otherwise defined, meanings of all technical and scientific terms used in this specification are the same as those usually understood by persons skilled in the technical field to which the present invention belongs. Terms used in the specification of the present invention are merely intended to describe objectives of the specific embodiments, but are not intended to limit the present invention. A term "and/or" used in this specification includes any or all combinations of one or more related listed items.

In addition, the technical features involved in the different embodiments of the present invention described below may be combined with each other, provided that they do not constitute a conflict with each other.

Figure 1:
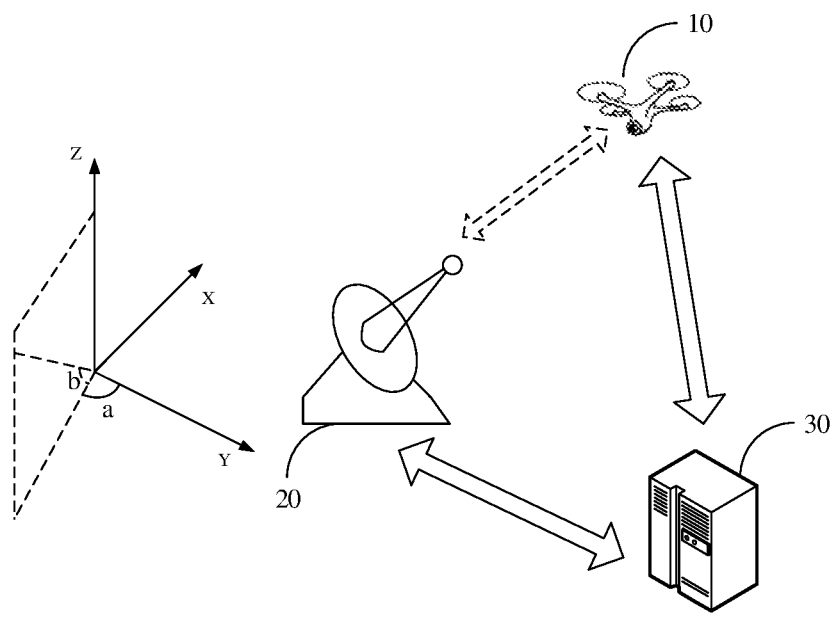
FIG. 1 is a schematic diagram of an application environment according to an embodiment of the present invention.

FIG. 1 shows an application environment according to an embodiment of the present invention. As shown in FIG. 1, the application environment includes an unmanned aerial vehicle 10, a directional antenna 20 and a control system 30.

The unmanned aerial vehicle 10 may be any type of aerial unmanned aircraft, such as a four-axis unmanned aerial vehicle. Specifically, the unmanned aerial vehicle 10 may adopt a plurality of types of fuselage structures or shapes and may be driven by one or more motors to move at a specific velocity in a space.

As a carrier, the unmanned aerial vehicle 10 may carry different functional devices to be used in a plurality of possible application scenarios, such as terrain survey, high altitude shooting and surveillance.

The directional antenna 20 is a wireless transceiver configured to establish a communication channel with the unmanned aerial vehicle 10 and transmit data in real time.

To ensure an effect of communication between the directional antenna 20 and the unmanned aerial vehicle 10, the directional antenna 20 needs to be aligned with the unmanned aerial vehicle 10 (that is, pointing toward the unmanned aerial vehicle 10) in the real-time data transmission to ensure a sufficient gain of the antenna.

To increase application scenarios of a motion tracking system, the directional antenna 20 may be carried by a corresponding carrier and moves following the unmanned aerial vehicle 10 through the motion of the carrier. Specifically, the corresponding carrier, for example, a vehicle, a ship or another aircraft, may be selected according to an actual application scenario. In addition to having sufficient mobility, the directional antenna 20 needs to maintain a proper target angle (that is, a direction to which the directional antenna points in a stereoscopic space) to keep tracking of the unmanned aerial vehicle 10.

In this embodiment, as shown in FIG. 1, the target angle may be specifically represented by an azimuth a and a pitch b, which are on two planes perpendicular to each other. For ease of calculation and statement, it is specified that for the azimuth, the north represents 0°, a clockwise direction represents $[0, \pi]$ and a counterclockwise direction represents $[0, -\pi]$; for the pitch, an angle above a horizontal reference plane is positive and an angle below the horizontal reference plane is negative.

The control system 30 is a control and computation center of the entire motion tracking system. The target angle of the directional antenna 20 may be correspondingly adjusted according to a relative position relationship and a moving state between the unmanned aerial vehicle 10 and the directional antenna 20 and using a corresponding algorithm or guidance method, so that the directional antenna 20 can always keep tracking of the unmanned aerial vehicle 10, avoiding a communication disconnection. In this embodiment, the control system 30 may receive information about positions and velocities of the directional antenna and the unmanned aerial vehicle by using a GPS receiver and adjust and control the target angle of the directional antenna 20 accordingly.

The motion tracking system including the directional antenna 20 and the control system 30 has an azimuth-pitch structure, and there is a tracking blind area at a top of the directional antenna 20. The blind area tracking method provided in the embodiments of the present invention may be applied to the control system 30 to keep continuous tracking of the unmanned aerial vehicle 10, to avoid temporarily losing a target.

Figure 2:
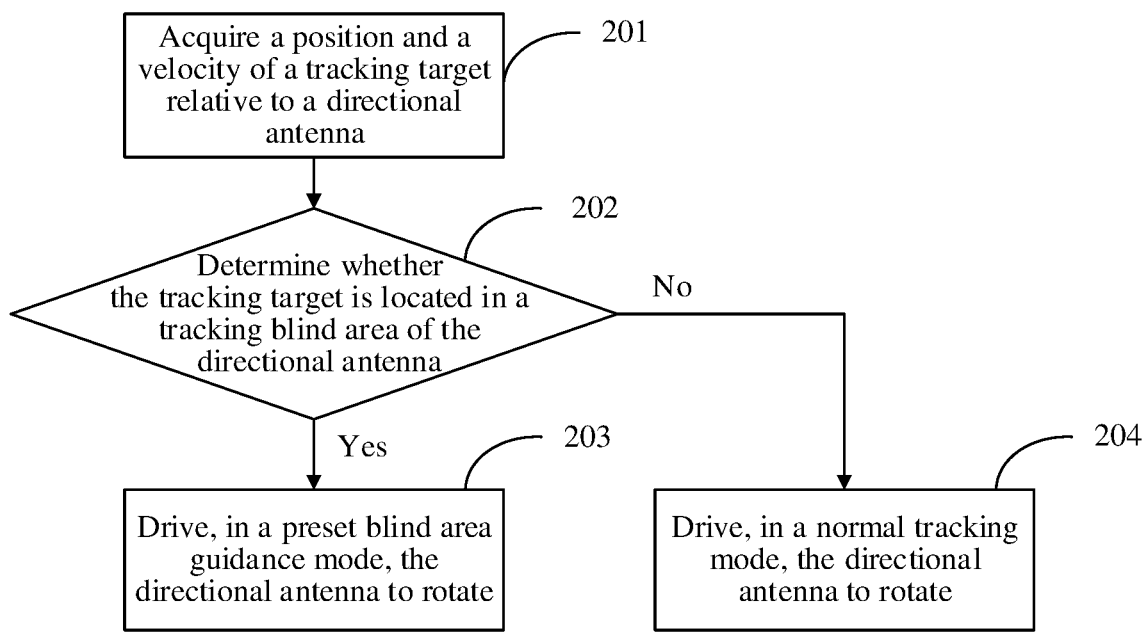
FIG. 2 is a flowchart of a blind area tracking method according to an embodiment of the present invention.

FIG. 2 is a flowchart of a blind area tracking method for a directional antenna according to an embodiment of the present invention. As shown in FIG. 2, the method includes the following steps:

Step 201: Acquire a position and a velocity of a tracking target relative to a directional antenna.

Specifically, the tracking target may be a movable target with which the directional antenna needs to be aligned and establish a communication connection. In this embodiment, an unmanned aerial vehicle is used as an example of the tracking target.

To execute a corresponding task or implement a specific function, an unmanned aerial vehicle has corresponding position and velocity information at different moments. In this embodiment, a corresponding spatial coordinate system may be established with a position of the directional antenna as a reference point to represent information about a position and a velocity of the unmanned aerial vehicle relative to the directional antenna. Specifically, positions and velocities of the tracking target and the directional antenna are respectively acquired by using sensors with corresponding functions, and then the position and the velocity of the tracking target relative to the directional antenna are acquired.

Step 202: Determine, according to the position and the velocity, whether the tracking target is located in a tracking blind area of the directional antenna.

According to a relative position relationship between the unmanned aerial vehicle 10 and the directional antenna 20 and velocity information of the unmanned aerial vehicle 10 and the directional antenna 20, the control system 30 may determine through calculation whether the tracking target is within the tracking blind area.

Step 203: Drive, in a preset blind area guidance mode and when the tracking target is located in the tracking blind area, the directional antenna to rotate.

The control system 30 supports two preset working modes, that is, the blind area guidance mode and a normal tracking mode. When the unmanned aerial vehicle 10 is within the tracking blind area, the control system 30 works in the blind area guidance mode to ensure that the directional antenna 20 can keep continuous tracking of the unmanned aerial vehicle 10. A corresponding target angle control policy may be adopted to make the directional antenna 20 rotate accordingly to track the unmanned aerial vehicle, so that continuous communication between the directional antenna 20 and the unmanned aerial vehicle 10 may be implemented.

When the unmanned aerial vehicle 10 is out of the tracking blind area, the control system 30 may adopt the normal tracking mode. The control system 30 solves relative position information of the unmanned aerial vehicle 10 and the directional antenna 20 to acquire the target angle of the directional antenna 20 (that is, the foregoing azimuth and pitch), thereby driving the directional antenna to rotate (step 204). Specifically, the control system 30 may adjust the target angle of the directional antenna by driving an azimuth axis and a pitch axis of the directional antenna to rotate, so that the directional antenna is aligned with the unmanned aerial vehicle (that is, the tracking target).

In some embodiments, whether the unmanned aerial vehicle is within the tracking blind area may be specifically determined based on two different phases, that is, a phase in which the unmanned aerial vehicle enters the tracking blind area and a phase in which the unmanned aerial vehicle leaves the tracking blind area.

That the tracking target is close to the directional antenna belongs to the phase of determining whether the unmanned aerial vehicle enters the tracking blind area. In this case, a critical time at which the tracking target enters the tracking blind area may be first calculated. The critical time is a moment when the unmanned aerial vehicle 10 just enters a boundary of the tracking blind area, and may be used as a specific indicator for determining whether the unmanned aerial vehicle 10 enters the tracking blind area.

Then, whether the tracking target enters the tracking blind area is determined according to the critical time and the position and the velocity of the tracking target. After the critical time is acquired through calculation, whether the unmanned aerial vehicle 10 has entered the tracking blind area may be determined according to a current moving state of the unmanned aerial vehicle 10.

Figure 3:
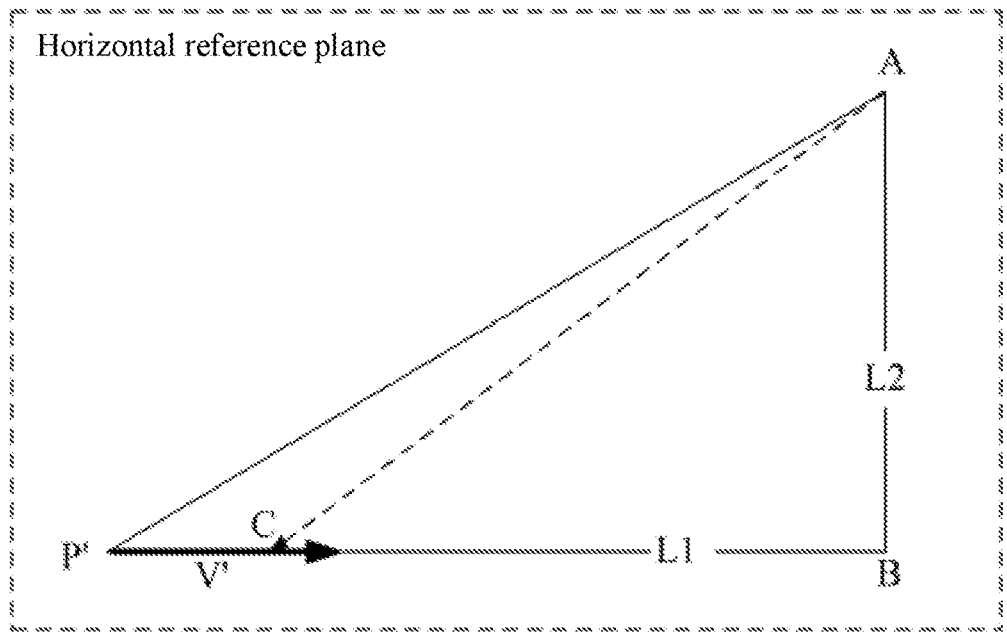
FIG. 3 is a schematic diagram of a horizontal reference plane when a tracking target is close to a directional antenna according to an embodiment of the present invention.

FIG. 3 is a schematic diagram of projections of the unmanned aerial vehicle 10 and the directional antenna 20 in a horizontal reference plane according to an embodiment of the present invention. With reference to the projections shown in FIG. 3, the following describes, by using a geometrical relationship, a specific process of determining.

As shown in FIG. 3, AC represents a projection of the directional antenna currently pointing to the horizontal reference plane. A represents the position of the directional antenna. P' represents a projection of the tracking target in the horizontal reference plane and v' represents a velocity projection of the tracking target in the horizontal reference plane.

Along a velocity direction, there is a straight line L1 in the horizontal reference plane. B represents an intersection point of the straight line L1 that passes through v' in the horizontal reference plane and a vertical line L2 perpendicular to the straight line L1. The vertical line L2 is a vertical line that passes through the point A.

The critical time may be calculated using the following formula (1):

$$K\varphi_{max}t_I = \arctan\left(\frac{v't_I}{AB}\right); \quad (1)$$

K representing an azimuth velocity margin coefficient, $\varphi_{max}$ representing a maximum azimuth velocity of the directional antenna and $t_1$ representing the critical time.

The critical time is a time value that meets formula (1). When other data is known, the control system 30 may acquire, through derivation and calculation, the critical time that meets formula (1).

The azimuth velocity margin coefficient is a percentage accounting for the maximum azimuth velocity of the directional antenna. To ensure that the directional antenna has a sufficient margin to meet requirements of some acceleration maneuvering motions or steering motions of the unmanned aerial vehicle 10 within the tracking blind area, a proper value may be set for K according to actual conditions.

In some embodiments, the value of K may be set to 80%. That is, the directional antenna has a 20% angular velocity margin within the tracking blind area. In this way, it may be ensured that the directional antenna 20 has an additional steering capability in the preset blind area guidance mode, so that an effect of tracking the unmanned aerial vehicle 10 can be maintained under extreme conditions such as acceleration maneuvering or carrier steering of the unmanned aerial vehicle 10 within the tracking blind area.

Correspondingly, when P'B<v't$_1$, it is determined that the tracking target enters the tracking blind area. When P'B>v't$_1$, it is determined that the tracking target is out of the tracking blind area.

In some embodiments, when the unmanned aerial vehicle is in a phase of being close to the directional antenna and entering the tracking blind area, with reference to the schematic diagram shown in FIG. 3, an azimuth velocity of the directional antenna may be calculated using the following formula (2):

$$\dot{\varphi}_I = \frac{\varphi_2}{t_1}; t_1 = \frac{P'B}{v'}, \quad (2)$$

$\dot{\varphi}_1$ representing the azimuth velocity and $\varphi_2$ representing an included angle (that is, an angle CAB) between the projection of the directional antenna currently pointing to the horizontal reference plane and the vertical line.

After acquiring the azimuth velocity through calculation, the control system 30 may drive the directional antenna 20 to rotate at the azimuth velocity (that is, to rotate around a direction axis at a particular angular velocity), thereby keeping the tracking of the unmanned aerial vehicle 10.

Figure 4:
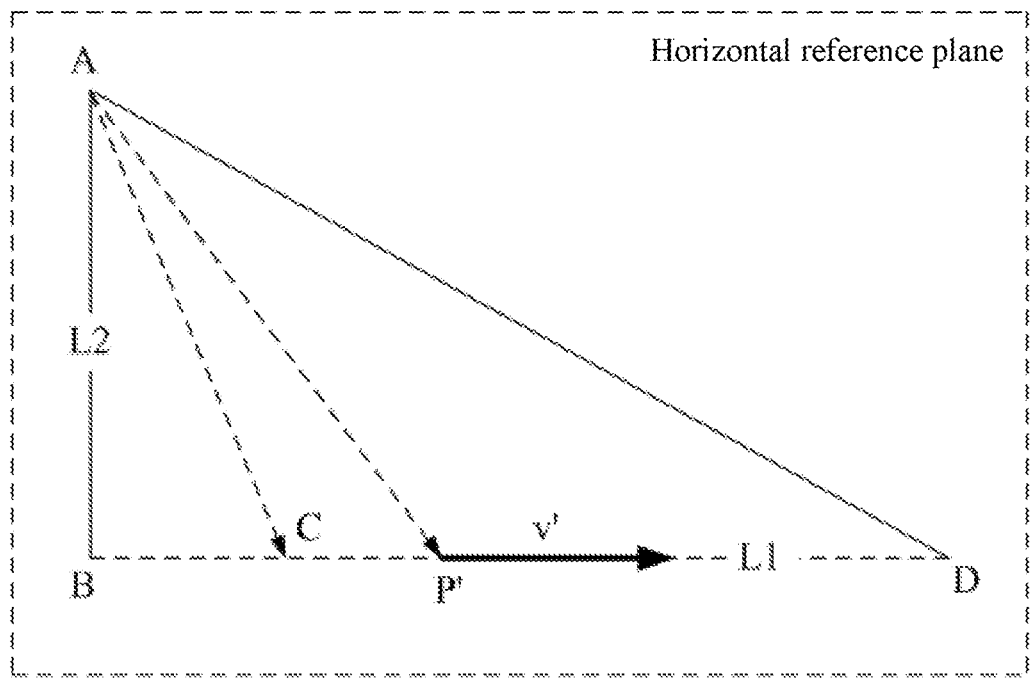
FIG. 4 is a schematic diagram of a horizontal reference plane when a tracking target is away from a directional antenna according to an embodiment of the present invention.

That the tracking target is away from the directional antenna belongs to the phase of determining whether the unmanned aerial vehicle leaves the tracking blind area. FIG. 4 is a schematic diagram of the horizontal reference plane when the unmanned aerial vehicle is away from the directional antenna according to an embodiment of the present invention.

As shown in FIG. 4, AC represents a projection of the directional antenna currently pointing to the horizontal reference plane. A represents the position of the directional antenna. P' represents a projection of the tracking target in the horizontal reference plane and v' represents a velocity projection of the tracking target in the horizontal reference plane.

Along a velocity direction, there is a straight line L1 in the horizontal reference plane. B represents an intersection point of the straight line L1 that passes through v' in the horizontal reference plane and a vertical line L2 perpendicular to the straight line L1. The vertical line L2 is a vertical line that passes through the point A. D represents an intersection point between the tracking blind area and the straight line L1. D meets the following formula: P'D=v't$_2$;

$\angle BAP'=\varphi_3, \angle BAC=\varphi_4$ and $\angle CAD=\varphi_5$.

Whether the tracking target leaves the tracking blind area is detected using a predetermined detection period, which specifically includes:

determining, using the following formula (3), whether the unmanned aerial vehicle 10 has flown away from the tracking blind area:

$$\arctan\left(\frac{v't_{0^+} + BP'}{AB}\right) - \varphi_3 > K\dot{\varphi}_{max}t_{0^+}; \quad (3)$$

$t_{0^+}$ representing the detection period, P' representing the projection of the tracking target in the horizontal reference plane, K representing the azimuth velocity margin coefficient, $\dot{\varphi}_{max}$ representing the maximum azimuth velocity of the directional antenna and v' representing the velocity projection of the tracking target in the horizontal reference plane.

In some embodiments, the detection period may be a very short period of time, for example, 1 ms or a longer/shorter period. The detection period may be specifically set by persons skilled in the art according to actual conditions.

Formula (3) is a conditional expression for determining. When the acquired information about the velocity and the position of the unmanned aerial vehicle can meet formula (3), it may be determined that the tracking target has not left the tracking blind area. When the acquired information about the velocity and the position cannot meet formula (3), it is determined that the tracking target has left the tracking blind area.

Based on the schematic diagram shown in FIG. 4, in some embodiments, when the tracking target is in a phase of being away from the directional antenna but not leaving the tracking blind area, an azimuth velocity of the directional antenna may be calculated using the following formula (4):

$$\dot{\varphi}_O = \frac{\varphi_5}{t_2}; \quad (4)$$

$t_2$ being calculated using the following formula (5):

$$\arctan\left(\frac{v't_2 + BP'}{AB}\right) - \varphi_4 = K\dot{\varphi}_{max}t_2. \quad (5)$$

Similarly, after acquiring the corresponding azimuth velocity through calculation, the control system 30 may drive the directional antenna to rotate at the corresponding azimuth velocity (that is, to drive the directional antenna to rotate around a direction axis), thereby implementing continuous tracking of the unmanned aerial vehicle within the tracking blind area.

In addition to the application environment of a motion tracking platform for the unmanned aerial vehicle shown in FIG. 1, the method provided in the embodiments of the present invention may also be applied to another motor-driven power device, to control the directional antenna to keep tracking of the tracking target within the tracking blind area.

In some other embodiments, in addition to control of the azimuth velocity, the pitch of the directional antenna may be further adjusted, thereby ensuring that the directional antenna can track the unmanned aerial vehicle well within the tracking blind area and maintaining good communication with the unmanned aerial vehicle.

Figure 5:
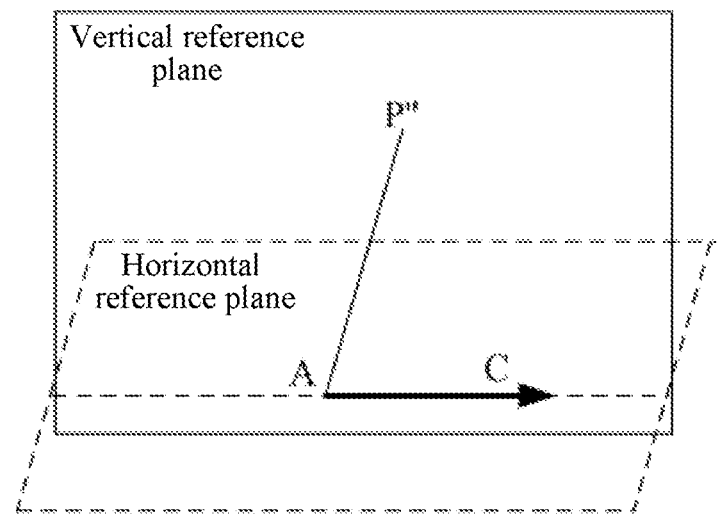
FIG. 5 is a schematic diagram of a vertical reference plane according to an embodiment of the present invention.

FIG. 5 is a schematic diagram of adjusting the pitch of the directional antenna according to an embodiment of the present invention. As shown in FIG. 5, AC represents a projection of the directional antenna currently pointing to the horizontal reference plane and P'' represents a projection of the tracking target in a vertical reference plane, the vertical reference plane P1 being a vertical plane in which the azimuth of the directional antenna is located.

The control system 30 may calculate the pitch of the directional antenna using the following formula (6):

$$\theta = \angle CAP'' \quad (6);$$

$\theta$ representing the pitch.

After determining the pitch of the directional antenna, the control system 30 further drives the directional antenna to rotate at the pitch (that is, the control system 30 drives the directional antenna to rotate around the pitch axis), to track the unmanned aerial vehicle.

There are two different phases in the blind area tracking method provided in the embodiments of the present invention. In the first phase, the unmanned aerial vehicle is close to the directional antenna. In the second phase, the unmanned aerial vehicle is away from the directional antenna.

In the first phase, the critical time used for determining whether the unmanned aerial vehicle has entered the tracking blind area is calculated using formula (1). After the unmanned aerial vehicle enters the tracking blind area, the azimuth velocity of the directional antenna is calculated using formula (2).

In the second phase, formula (3) is used as a condition for determining, after sampling is performed at intervals of a particular period of time, whether the unmanned aerial vehicle has left the tracking blind area. If the unmanned aerial vehicle has not left the tracking blind area, the azimuth velocity of the directional antenna is calculated using formulas (4) and (5).

In addition, if the unmanned aerial vehicle is within the tracking blind area, a current pitch of the directional antenna is calculated using formula (6).

According to the blind area tracking method provided in the embodiments of the present invention, whether the tracking target enters or leaves the blind area may be determined in real time, and real-time guidance for the azimuth and the pitch of the directional antenna is implemented within the blind area, thereby ensuring accuracy of tracking within the tracking blind area.

In the foregoing preset blind area guidance mode, the target may be continuously tracked within the blind area. The azimuth velocity margin coefficient is set, and a particular azimuth velocity adjustment margin is reserved. Therefore, the directional antenna may track the target well even when the tracking target is maneuvering in the tracking blind area.

Figure 6:
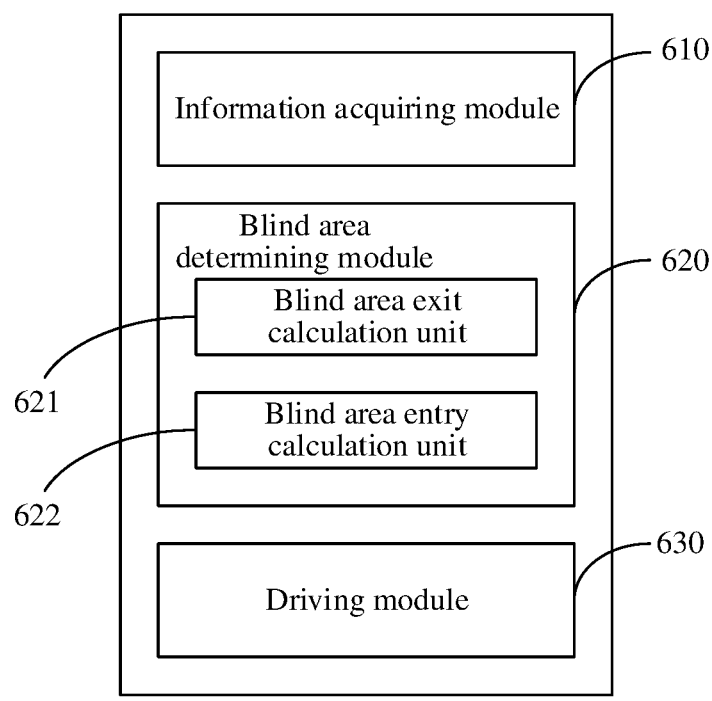
FIG. 6 is a structural block diagram of a blind area tracking apparatus according to an embodiment of the present invention.

An embodiment of the present invention further provides a blind area tracking apparatus. FIG. 6 is a schematic structural diagram of the blind area tracking apparatus according to this embodiment of the present invention. As shown in FIG. 6, the blind area tracking apparatus includes an information acquiring module 610, a blind area determining module 620 and a driving module 630.

The information acquiring module 610 is configured to acquire a position and a velocity of a tracking target. The blind area determining module 620 is configured to determine, according to the position and the velocity, whether the tracking target is located in a tracking blind area of a directional antenna. The driving module 630 is configured to drive the directional antenna to rotate around an azimuth axis and a pitch axis, so that the directional antenna is aligned with the tracking target.

As shown in FIG. 1, in this embodiment, a direction to which the directional antenna points in a stereoscopic space may be represented by an azimuth and a pitch, which are on two planes perpendicular to each other. The azimuth axis is an axis corresponding to the azimuth and may be an axis Z in FIG. 1. The pitch axis is an axis corresponding to the pitch and may be an axis Y in FIG. 1.

When the directional antenna rotates around the azimuth axis, the azimuth changes accordingly. Similarly, when the pitch axis of the directional antenna rotates, the pitch axis also changes accordingly.

Therefore, after determining an azimuth velocity and a pitch that are required, the driving module 630 may control a current direction of the directional antenna by separately controlling a velocity at which the directional antenna rotates around the azimuth axis and an angle at which the directional antenna rotates around the pitch axis, to ensure that the directional antenna points toward the tracking target.

During actual operations, the information acquiring module 610 acquires the position and the velocity of the tracking target relative to the directional antenna first. Then, the blind area determining module 620 determines, according to the position and the velocity, whether the tracking target is located in the tracking blind area of the directional antenna.

According to a result of the determining by the blind area determining module 620, the driving module 630 drives, in a preset blind area guidance mode and when the tracking target is located in the tracking blind area, the directional antenna to rotate around the azimuth axis and the pitch axis. When the tracking target is out of the tracking blind area, the driving module 630 drives, in a normal tracking mode, the directional antenna to rotate around the azimuth axis and the pitch axis.

In some embodiments, as shown in FIG. 6, the blind area determining module 620 may specifically include a blind area entry calculation unit 621 and a blind area exit calculation unit 622.

The blind area entry calculation unit 621 is configured to: calculate a critical time at which the tracking target enters the tracking blind area when the tracking target is close to the directional antenna; and determine whether the tracking target enters the tracking blind area according to the critical time and the position and the velocity of the tracking target.

The blind area exit calculation unit 622 is configured to detect, by using a predetermined detection period when the tracking target is away from the directional antenna, whether the tracking target leaves the tracking blind area. That is, determining whether the tracking target is within the tracking blind is divided into two different phases.

Specifically, according to calculation results of the blind area entry calculation unit 621 and the blind area exit calculation unit 622, the driving module 630 may specifically adopt the corresponding blind area guidance mode or normal tracking mode to control the azimuth axis and the pitch axis of the directional antenna to rotate, to keep tracking of an unmanned aerial vehicle.

The blind area entry calculation unit 621, the blind area exit calculation unit 622 and the driving module 630 may specifically perform the steps of the calculating method (that is, the preset blind area guidance mode) provided in the foregoing method embodiments to acquire the azimuth and the pitch of the directional antenna through calculation.

It should be noted that, the foregoing method and apparatus embodiments are implemented based on a same inventive concept. Technical effects and technical features that may be provided in the method embodiments may be executed or implemented by corresponding functional modules in the apparatus embodiments. For ease of description, details are not described herein again.

Figure 7:
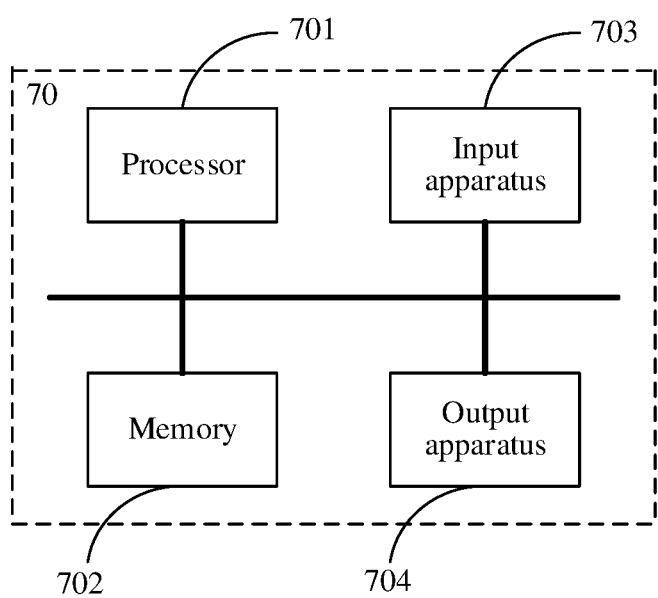
FIG. 7 is a structural block diagram of an electronic device according to an embodiment of the present invention.

FIG. 7 is a schematic structural diagram of an electronic device according to an embodiment of the present invention. The electronic device may be used as a basis for hardware of the control system 30 to perform the blind area tracking method provided in the foregoing method embodiments. As shown in FIG. 7, the electronic device 70 includes one or more processors 701 and a memory 702. One processor 701 is used as an example in FIG. 7.

The foregoing electronic device may further include an input apparatus 703 and an output apparatus 704. Certainly, another suitable apparatus module may be added or reduced according to actual conditions.

The processor 701, the memory 702, the input apparatus 703 and the output apparatus 704 may be connected using a bus or in another manner. In FIG. 7, connection using a bus is used as an example.

As a non-volatile computer-readable storage medium, the memory 702 may be configured to store a non-volatile software program, a non-volatile computer executable program and module, such as a program instruction or module corresponding to the blind area tracking method provided in the embodiments of the present invention, for example, the information acquiring module 610, the blind area determining module 620 and the driving module 630 shown in FIG. 6. The processor 701 executes various functional applications and data processing of a server by running the non-volatile software program, instruction and module stored in the memory 702. That is, the processor 701 implements the blind area tracking method provided in the foregoing method embodiments.

The memory 702 may include a program storage area and a data storage area. The program storage area may store an operating system, and an application program required by at least one function. The data storage area may store data created according to use of the blind area tracking apparatus, and the like. In addition, the memory 702 may include a high speed random access memory, and may also include a non-volatile memory, such as at least one magnetic disk storage device, a flash memory, or another non-volatile solid-state storage device. In some embodiments, the memory 702 may optionally include a memory disposed remotely relative to the processor 70. Examples of the foregoing network include, but are not limited to, the Internet, an intranet, a local area network, a mobile communications network and a combination thereof.

The input apparatus 703 may receive inputted numerical or character information and generate a key signal input related to user settings and function control of the blind area tracking apparatus. The output apparatus 704 may include a display device such as a display screen. The one or more modules are stored in the memory 702 and perform, when executed by the one or more processors 701, the blind area tracking method provided in any of the foregoing method embodiments.

Persons of skill in the art may further be aware that, each step of the exemplary motor control method described in the embodiments disclosed in this specification can be implemented by using electronic hardware, computer software, or a combination thereof. To clearly describe interchangeability between the hardware and the software, compositions and steps of each example have been generally described according to functions in the foregoing descriptions. Whether the functions are performed by hardware or software depends on particular applications and design constraint conditions of the technical solutions.

Persons skilled in the art may use different methods to implement the described functions for each particular application, but it should not be considered that the implementation goes beyond the scope of the present invention. The computer software may be stored in a computer-readable storage medium. When the program is executed, the program may include the procedures of the embodiments of the foregoing methods. The storage medium may be a magnetic disk, an optical disc, a read-only memory, a random access memory, or the like.

Finally, it should be noted that the foregoing embodiments are merely intended for describing the technical solutions of the present invention, but not for limiting the present invention. Under the thinking of the present invention, combinations may also be made between the technical features in the foregoing embodiments or in different embodiments, the steps may be implemented in any order, and there are many other variations in different aspects of the present invention as described above, which are not provided in detail for simplicity. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A blind area tracking method for a directional antenna, comprising:

acquiring a position and a velocity of a tracking target relative to the directional antenna;

determining, according to a critical time and the position and the velocity of the tracking target relative to the directional antenna, whether the tracking target enters the tracking blind area; wherein the critical time is calculated using the following formula:

$$K\dot{\varphi}_{max} t_l = \arctan\left(\frac{v' t_l}{AB}\right);$$

K representing an azimuth velocity margin coefficient, wherein a value of the azimuth velocity margin coefficient K is 80%, $\dot{\varphi}$max representing a maximum azimuth velocity of the directional antenna, $t_l$ representing the critical time, v' representing a velocity projection of the tracking target in a horizontal reference plane, A representing a position of the directional antenna and B representing an intersection point of a straight line along v' in the horizontal reference plane and a vertical line perpendicular to the straight line, with the vertical line passing through the point A; and driving, in a preset blind area guidance mode and when the tracking target Is located in the tracking blind area, the directional antenna to rotate.

2. The method according to claim 1, wherein the determining, according to the position and the velocity, whether the tracking target is located in a tracking blind area of the directional antenna specifically comprises:

calculating a critical time at which the tracking target enters the tracking blind area; and detecting, by using a predetermined detection period, whether the tracking target leaves the tracking blind area.

3. The method according to claim 1, wherein the determining whether the tracking target enters the tracking blind area specifically comprises:

determining that the tracking target enters the tracking blind area when P'B<v't$_1$; or determining that the tracking target is out of the tracking blind area when P'B>v't$_1$;

P' representing a projection of the tracking target in the horizontal reference plane.

4. The method according to claim 3, wherein the driving, in a preset blind area guidance mode, the directional antenna to rotate specifically comprises:

when the tracking target is close to the directional antenna, calculating an azimuth velocity of the directional antenna using the following formula:

$$\dot{\varphi}_l = \frac{\varphi_2}{t_l}; t_l = \frac{P'B}{v'},$$

$\dot{\varphi}_1$ representing the azimuth velocity and $\varphi_2$ representing an included angle between a projection of the directional antenna currently pointing to the horizontal reference plane and the vertical line; and driving the directional antenna to rotate at the azimuth velocity, to track the tracking target.

5. The method according to claim 2, wherein the detecting, by using a predetermined detection period, whether the tracking target leaves the tracking blind area specifically comprises:

calculating whether the velocity and the position of the tracking target meet the following formula in the detection period:

$$\arctan\left(\frac{v' t_{0^{\pm}} + BP'}{AB}\right) - \varphi_3 > K\dot{\varphi}_{max} t_0;$$

$t_0$ representing the detection period, P' representing a projection of the tracking target in a horizontal reference plane, K representing an azimuth velocity margin coefficient, $\dot{\varphi}_{max}$ representing a maximum azimuth velocity of the directional antenna, v' representing a velocity projection of the tracking target in the horizontal reference plane, A representing a position of the directional antenna, B representing an intersection point of a straight line along v in the horizontal reference plane and a vertical line perpendicular to the straight line, with the vertical line passing through the point A, and $\varphi_3$ representing a degree of an angle BAP'; and determining that the tracking target does not leave the tracking blind area when the velocity and the position of the tracking target meet the preceding formula;

or determining that the tracking target leaves the tracking blind area when the velocity and the position of the tracking target do not meet the preceding formula.

6. The method according to claim 5, wherein the driving, in a preset blind area guidance mode, the directional antenna to rotate specifically comprises:

when the tracking target is away from the directional antenna, calculating an azimuth velocity of the directional antenna using the following formula:

$$\dot{\varphi}_o = \frac{\varphi_5}{t_2};$$

$\varphi_5$ representing a degree of an angle CAD, a point D representing an intersection point of the tracking blind area and the vertical line and a point C representing an intersection point of a projection of the directional antenna currently pointing to the horizontal reference plane and the vertical line; and $t_2$ being calculated using the following formula:

$$\arctan\left(\frac{v't_2 + BP'}{AB}\right) - \varphi_4 = K\dot{\varphi}_{max}t_2;$$

$\varphi_4$ representing a degree of an angle BAC;
the point D meeting the following formula:
P'D=v'$t_2$; and driving the directional antenna to rotate at the azimuth velocity, to track the tracking target.

7. The method according to claim 2, wherein the driving, in a preset blind area guidance mode, the directional antenna to rotate specifically comprises:

calculating a pitch of the directional antenna using the following formula:

θ=∠CAP";

θ representing the pitch, AC representing a projection of the directional antenna currently pointing to a horizontal reference plane and P" representing a projection of the tracking target in a vertical reference plane, the vertical reference plane being a vertical plane in which an azimuth of the directional antenna is located; and driving the directional antenna to rotate to the azimuth, to track the tracking target.

8. A blind area tracking apparatus, comprising:
a processor, and a memory storing a computer program executable by the processor;
wherein when the computer program is executed by the processor, the processor is configured to:

acquire a position and a velocity of a tracking target relative to a directional antenna;

determine, according to a critical time and the position and the velocity of the tracking target relative to the directional antenna, whether the tracking target enters the tracking blind area;

wherein the critical time is calculated using the following formula:

$$K\dot{\varphi}_{max}t_I = \arctan\left(\frac{v't_I}{AB}\right);$$

K representing an azimuth velocity margin coefficient, wherein a value of the azimuth velocity margin coefficient K is 80%, $\dot{\varphi}$max representing a maximum azimuth velocity of the directional antenna, $t_1$ representing the critical time, v' representing a velocity projection of the tracking target in a horizontal reference plane, A representing a position of the directional antenna and B representing an intersection point of a straight line along v' in the horizontal reference plane and a vertical line perpendicular to the straight line, with the vertical line passing through the point A;

and drive, in a preset blind area guidance mode and when the tracking target is located in the tracking blind area, the directional antenna to rotate.

9. The apparatus according to claim 8, wherein the processor is further configured to:

calculate the critical time at which the tracking target enters the tracking blind area; and detect, by using a predetermined detection period, whether the tracking target leaves the tracking blind area.

10. The apparatus according to claim 9, wherein the processor is further configured to:

determine that the tracking target enters the tracking blind area when P'B<v'$t_1$;

or determining that the tracking target is out of the tracking blind area when P'B >v'$t_1$;

P' representing a projection of the tracking target in the horizontal reference plane.

11. The apparatus according to claim 10, wherein when the tracking target is close to the directional antenna, the processor is further configured to:

calculate an azimuth velocity of the directional antenna using the following formula:

$$\dot{\varphi}_I = \frac{\varphi_2}{t_I}; t_I = \frac{P'B}{v'},$$

$\dot{\varphi}_1$ representing the azimuth velocity and $\varphi_2$ representing an included angle between a projection of the directional antenna currently pointing to the horizontal reference plane and the vertical line; and drive the directional antenna to rotate at the azimuth velocity, to track the tracking target.

12. The apparatus according to claim 9, wherein the processor is specifically configured to:

calculate whether the velocity and the position of the tracking target meet the following formula in the detection period:

$$\arctan\left(\frac{v't_0^+ + BP'}{AB}\right) - \varphi_3 > K\dot{\varphi}_{max}t_0;$$

$t_0$ representing the detection period, P' representing a projection of the tracking target in a horizontal reference plane, K representing an azimuth velocity margin coefficient, $\dot{\varphi}_{max}$ representing a maximum azimuth velocity of the directional antenna, v' representing a velocity projection of the tracking target in the horizontal reference plane, A representing a position of the directional antenna, B representing an intersection point of a straight line along v in the horizontal reference plane and a vertical line perpendicular to the straight line, with the vertical line passing through the point A, and $\varphi_3$ representing a degree of an angle BAP'; and determine that the tracking target does not leave the tracking blind area when the velocity and the position of the tracking target meet the preceding formula; or determine that the tracking target leaves the tracking blind area when the velocity and the position of the tracking target do not meet the preceding formula.

13. The apparatus according to claim 12, wherein when the tracking target is away from the directional antenna, the processor is specifically configured to:

calculate an azimuth velocity of the directional antenna using the following formula:

$$\dot{\varphi}_o = \frac{\varphi_5}{t_2};$$

$\varphi_5$ representing a degree of an angle CAD, a point D representing an intersection point of the tracking blind area and the vertical line and a point C representing an intersection point of a projection of the directional antenna currently pointing to the horizontal reference plane and the vertical line; and $t_2$ being calculated using the following formula:

$$\arctan\left(\frac{v' t_2 + BP'}{AB}\right) - \varphi_4 = K\dot{\varphi}_{max} t_2;$$

$\varphi_4$ representing a degree of an angle BAC;

the point D meeting the following formula:

P'D=v'$t_2$; and drive the directional antenna to rotate at the azimuth velocity, to track the tracking target.

14. The apparatus according to claim 9, wherein the processor is further configured to: calculate a pitch of the directional antenna using the following formula: θ=∠CAP";

θ representing the pitch, AC representing a projection of the directional antenna currently pointing to the horizontal reference plane and P" representing a projection of the tracking target in a vertical reference plane, the vertical reference plane being a vertical plane in which the azimuth of the directional antenna is located; and drive the directional antenna to rotate at the azimuth velocity, to track the tracking target.

15. A motion tracking system for an unmanned aerial vehicle, comprising a directional antenna, a motion platform, an information receiver and a control system;

the directional antenna being disposed on the motion platform and the motion platform being configured to track the unmanned aerial vehicle;

the information receiver being configured to acquire a position of the directional antenna, a moving velocity of the motion platform and information about a position and a velocity of the unmanned aerial vehicle, the information being delivered by the unmanned aerial vehicle; and the control system being configured to drive, according to the position of the directional antenna, the moving velocity of the motion platform and the information about the position and the velocity of the unmanned aerial vehicle that are acquired by the information receiver and by using the blind area tracking method for a directional antenna according to claim 1, the directional antenna to rotate, so that the directional antenna keeps tracking of the unmanned aerial vehicle within the tracking blind area.

\* \* \* \* \*